United States Patent [19]

Fredericks et al.

[11] Patent Number: 4,690,661
[45] Date of Patent: Sep. 1, 1987

[54] TORSIONAL STRESS DISTRIBUTION FLEXIBLE COUPLING

[75] Inventors: Walter A. Fredericks; Edward W. McCullough, both of Warren, Pa.

[73] Assignee: Rexnord Inc., Brookfield, Wis.

[21] Appl. No.: 769,237

[22] Filed: Aug. 26, 1985

[51] Int. Cl.⁴ ............................................. F16D 3/52
[52] U.S. Cl. ............................................. 464/78
[58] Field of Search ............. 464/51, 69, 78, 92, 464/98, 99, 147

[56] References Cited

U.S. PATENT DOCUMENTS

| | | | |
|---|---|---|---|
| 1,557,958 | 10/1925 | Anderson | 464/78 |
| 1,558,576 | 10/1925 | Baumann | 464/78 |
| 2,888,258 | 5/1959 | Hoffstrom | 464/78 X |
| 3,071,942 | 1/1963 | Alcaro | 464/78 |
| 3,124,942 | 3/1964 | Rothfuss et al. | 464/99 |
| 3,150,506 | 9/1964 | Alcaro | 464/78 |
| 3,844,137 | 10/1974 | Zugel | 464/78 |
| 4,017,196 | 4/1977 | Pean et al. | 464/78 X |
| 4,523,916 | 6/1985 | Kizler et al. | 464/98 |

FOREIGN PATENT DOCUMENTS

| | | | |
|---|---|---|---|
| 172245 | 8/1952 | Austria | 464/99 |
| 52293 | 5/1982 | European Pat. Off. | 464/51 |
| 188233 | 10/1966 | U.S.S.R. | 464/78 |

Primary Examiner—Daniel P. Stodola
Attorney, Agent, or Firm—Richard C. Ruppin

[57] ABSTRACT

A flexible coupling in which one or more flex elements are positioned in a spaced apart relationship between two torsional force transfer members. Each of the flex elements are connected to another flex element or a transfer member and maintained at a spaced distance by spacer links positioned along the periphery of the flex elements. Areas of potentially high stress in the flex elements are distributed within the elements by varying the thickness of the flex elements in peripheral directions along the peripheral length of the flex elements and in radial directions relative to the axis of the flex elements.

16 Claims, 16 Drawing Figures

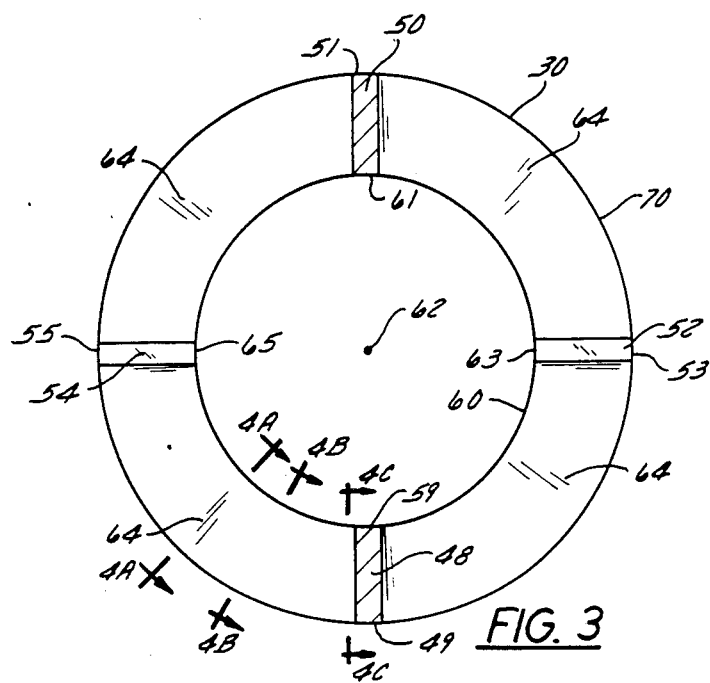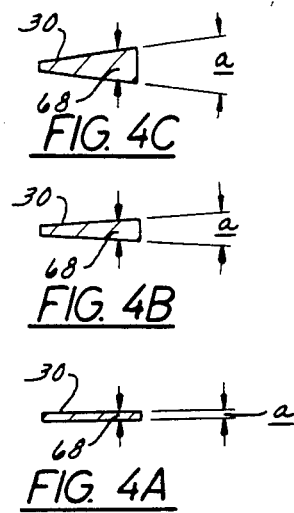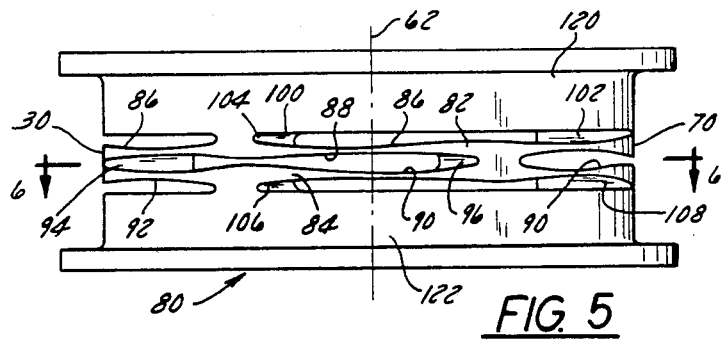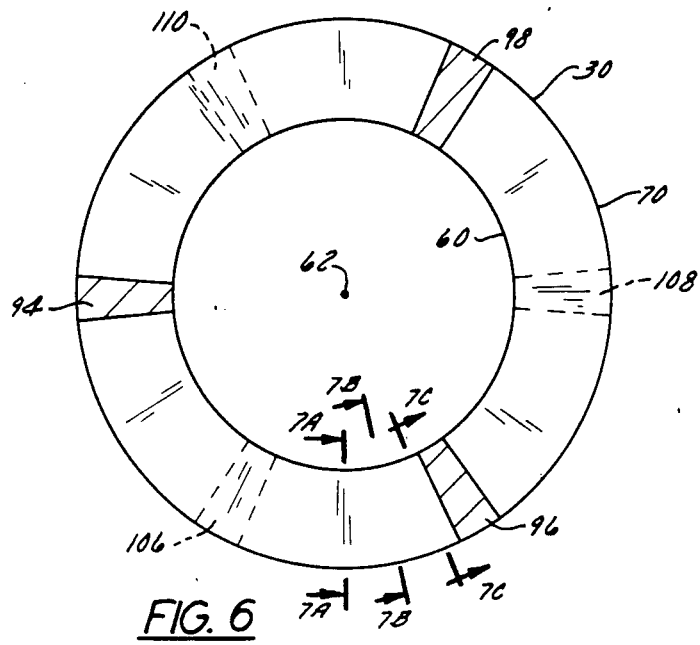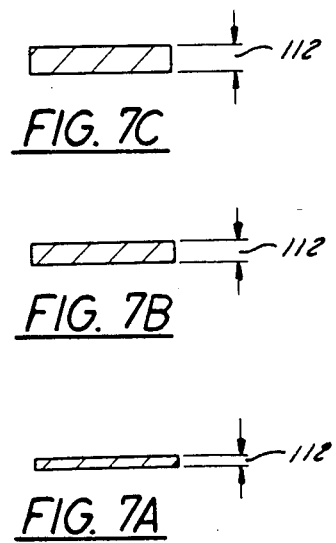

TORSIONAL STRESS DISTRIBUTION FLEXIBLE COUPLING

FIELD OF THE INVENTION

This invention relates to torque transmission couplings for transmitting rotary power from a motor to a machine and which compensate for misalignment between the motor and the machine. In particular, this invention relates to a flexible torque transmission coupling which distributes stresses caused by misalignment and rotary power transmission within itself during transmission of the rotary power to the machine.

BACKGROUND OF THE INVENTION

Flexible torque transmission couplings are old and well-known devices for transmitting rotary power under conditions in which misalignment exists between the rotating power source and the machine receiving the rotating power. Flexible couplings employing one or more flex elements consisting of an integral, single piece of material or comprising separate flex elements and other components connected together are widely used. An example of an integral, single element flexible coupling is disclosed in U.S. Pat. No. 3,071,942, issued Jan. 8, 1963. An example of a flexible coupling comprising a number of flex elements and connecting members to provide an overall coupling structure is disclosed in U.S. Pat. No. 2,745,267, issued May 15, 1956. Both types of flexible couplings, however, have the problem of high stress concentrations within the flex elements of the coupling due to transfer of torque from one element of the coupling to another and due to flexure of the elements resulting from misalignment of the coupling. Consequently, torque, speed, and misalignment capabilities are less than would be the case if the stresses could be better distributed throughout the flex elements.

SUMMARY OF THE INVENTION

It is a general object of this invention to provide a flexible coupling in which stresses due to the rotary power transmitted through the flexible coupling and stresses due to misalignment of the rotary power source and the device driven by the source are optimally distributed through the flexible coupling to increase misalignment capability and load carrying capacity.

The invention is carried out by providing a flexible coupling having two spaced apart transfer members and at least one flex element positioned between and spaced from the transfer members. Spacer links provide a connection between the transfer means and the flex elements and, where there is more than one flex element, between adjacent flex elements. Each flex element has potential areas of high stress due to application of rotary power due to misalignment of the coupled apparatus. However, the axial thickness of the flex element at said areas is made such that the stress is distributed within the flex element and the actual high stress areas are avoided.

Where there are potentially high stress areas in the flex element along its inner periphery intermediate the connection of the flex element, the thickness is made relatively large and decreased in a radial direction toward the outer periphery of the flex element. The thickness at such areas also decreases in a peripheral direction toward the connection of the flex element with adjacent spacer links. Where there are potentially high stress areas in the flex element adjacent to or at the juncture of the connection of the flex element with the spacer links and along the inner periphery of the flex element, the flex element thickness is made relatively small at such areas and increased in a radial direction toward the outer periphery of the flex element. The thickness at such areas increases in a peripheral direction away from the spacer links. To accomplish stress distribution in a flex element having potentially high stress areas both adjacent the connections with the spacer links and intermediate the spacer links, the radially outward decreasing thickness intermediate the spacer links, the radially outward increasing thickness adjacent the spacer links, together with changing of thickness in peripheral directions, may all be combined in the flex element.

Compressive and tensile stresses, and bending stresses, have been found to be induced in a flexible coupling of the type according to the instant invention in several ways. These include the applying of torque to the coupling. High tensile and/or compressive stress concentrations tend to occur along the inner periphery of a flex element intermediate the connection of the flex element and can be distributed and thereby avoided by increasing the thickness of the flex element in the stressed area and decreasing the thickness in a radially outward direction and in a peripheral direction toward the juncture of the flex element with the spacer links. In those situations where there is compressive force in the direction of the periphery of the flex element, an effect known as slender column buckling may be induced. Increasing the axial thickness of the flex element in such cases from a relatively small thickness intermediate angularly adjacent spacer links to a maximum thickness adjacent a spacer link will resist slender column buckling and provide a high degree of flexibility. Another way that the stresses are induced in the flexible coupling is by axial or angular flexure of the coupling which may occur as the result of misalignment of the shafts of the apparatus joined by the flexible coupling. High stresses due to forces of this type are concentrated at the radially inward end of the spacer link adjacent the juncture of the flex element with the spacer link. These stresses can be reduced and distributed by making the thickness of the flex element relatively small in the high stress area and gradually increasing the thickness in a radially outward direction. In addition, further distribution of stress due to applied torque may be obtained by providing at least three separate spacer links connecting each side of the flex element to a transfer member.

BRIEF DESCRIPTION OF THE DRAWINGS

Further objects and advantages of the invention will appear when taken in conjunction with the accompanying drawings, in which:

FIG. 3 is a cross-sectional view taken along lines 3—3 of FIG. 2;

FIGS. 4A, 4B and 4C are cross-sectional views respectively taken along lines 4A—4A, 4B—4B and 4C—4C of FIG. 3;

FIG. 5 is a side elevation view of another embodiment of the invention;

FIG. 6 is a cross-sectional view taken along lines 6—6 of FIG. 5;

FIGS. 7A, 7B and 7C are cross-sectional views taken along lines 7A—7A, 7B—7B and 7C—7C of FIG. 6;

DETAILED DESCRIPTION OF THE INVENTION

Figure 1:
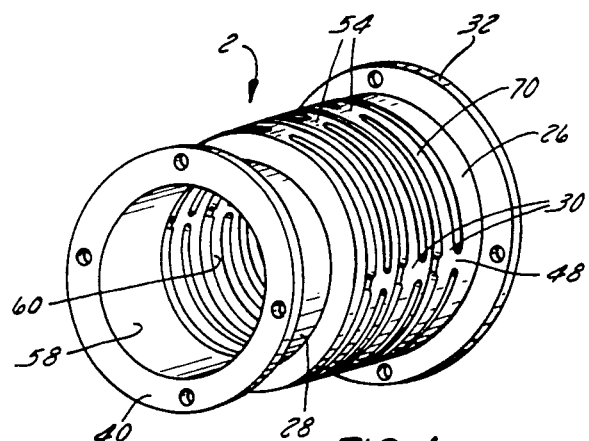
FIG. 1 is a perspective view of a flexible coupling according to the invention, connecting shafts of a drive motor and a machine to be provided with rotary power from the motor.

Referring generally to FIGS. 1-4, a flexible coupling 2 according to the invention is illustrated connecting a motor 4 providing rotary power to the shaft 8 of a machine (not shown) receiving the rotary power. A hub member 10 is mounted on a shaft 6 of the motor 4 and a hub member 12 is mounted on a machine shaft 8. The flexible coupling 2 is mounted between and on the hub members 10 and 12.

The hub 10 transfers rotary power or torque to the flexible coupling 2 to rotate it and is affixed to the shaft 6 by means of a key 14 seated in a keyway 16 in the shaft 6 and in a keyway 18 in the hub member 10. The hub member 12, through which the rotary power is transferred to the shaft 8, is affixed to the shaft 8 by means of a key 20 seated in a keyway 22 in the shaft 8 and in a keyway 24 in the hub 12. The flexible coupling 2 includes end torque transfer members 26 and 28 and flex elements 30 connected to the transfer members 26 and 28. The torque transfer member 26 has a circumferential radially extending flange 32 and the hub member 10 includes a radially extending flange 34. The flanges 32 and 34 are connected to each other by means of bolts 36 and nuts 38. The transfer member 28 includes a circumferential radially extending flange 40 and the hub 12 includes a radially extending flange 42. The flanges 40 and 42 are affixed to each other by bolts 44 and nuts 46. By means of the connection of the hubs 10 and 12 respectively to the shafts 6 and 8 and the connection of the transfer members 26 and 28 and thereby the flexible coupling 2 to the hubs 10 and 12, the rotary power of the motor 4 is transmitted to the machine requiring such power.

Figure 2:
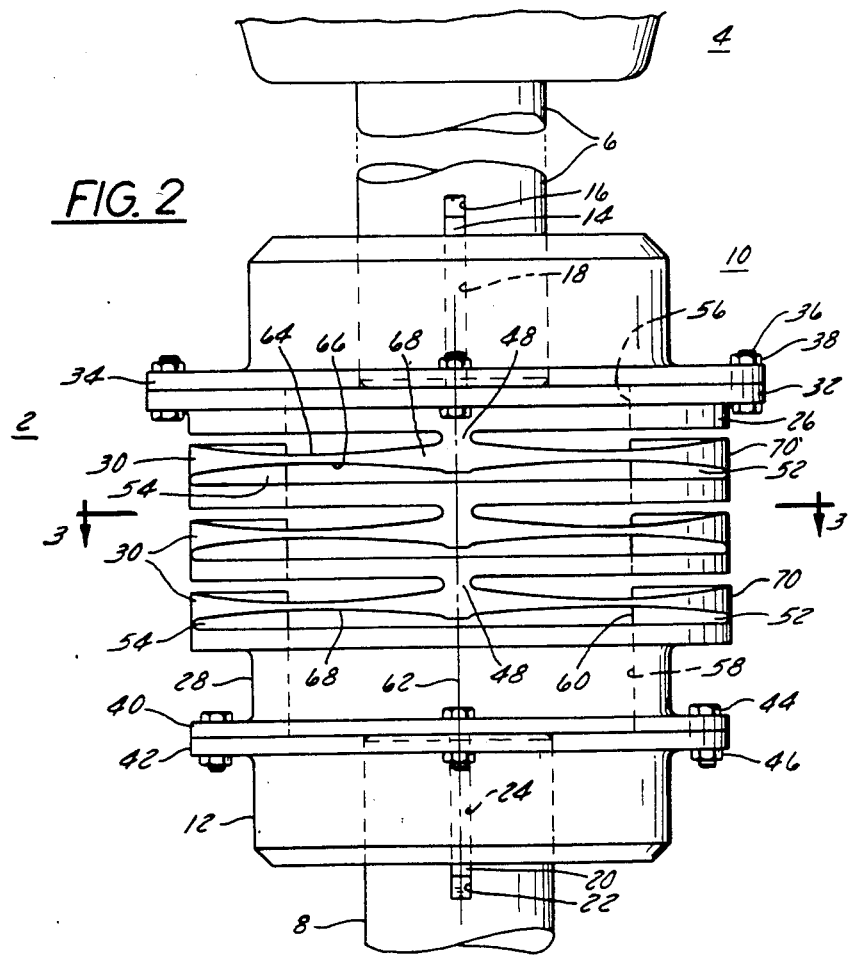
FIG. 2 is a side elevation view of an embodiment of the flexible coupling.
Figure 9:
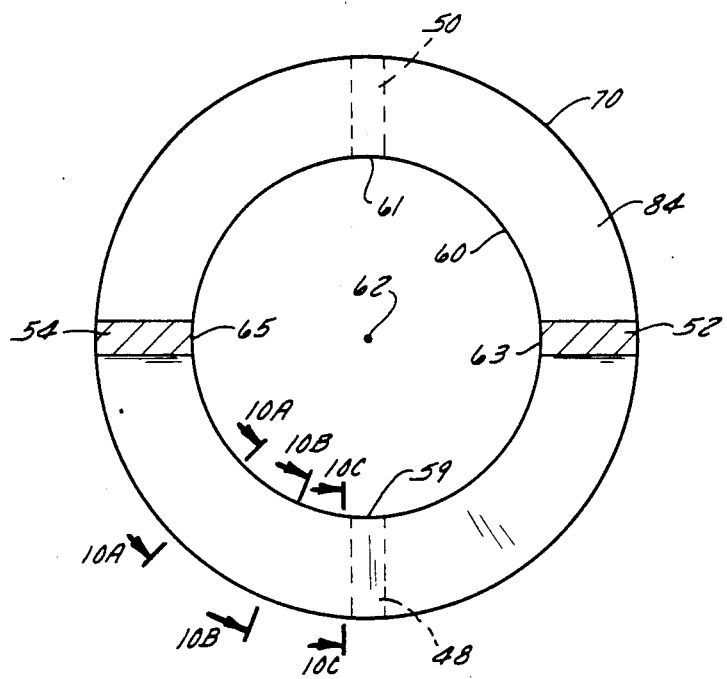
FIG. 9 is a cross-sectional view taken along lines 9—9 of FIG. 8.

With reference to FIGS. 2, 3 and 4A—4C, the flex element 30 most adjacent to the torque transfer member 26 is connected to the latter by means of spacer links 48 and 50. The flex element 30 most adjacent to the torque transfer member 28 is connected to it by means of spacer links 52 and 54. Adjacent flex elements 30 are connected to each other by means of either spacer links 48 and 50 or spacer links 52 and 54. The transfer members 26 and 28 and the flex elements 30 respectively have inner peripheral surfaces 56, 58 and 60 defining a hole extending through the flexible coupling 2 which may be circular as shown in FIG. 3. The flexible coupling 2 and thus the flex elements 30 and the transfer members 26 and 28 have an axis identified by the numeral 62 which extends toward the hub members 10 and 12 and the shafts 6 and 8. The flex elements 30 have opposite facing sides 64 and 66 defining peripheral areas on the flex elements and which face in the general direction of the axis 62 and a thickness 68 in the axial direction, that is, an axial thickness. In addition to the inner peripheral surface 60, the flex elements 30 have an outer peripheral surface 70 and, in the embodiment shown in FIGS. 2 and 3 the flex element 30 is ring-shaped. The spacer links are thus positioned on the peripheral areas between the inner and outer peripheral surfaces of the flex element 30. Note that the spacer links 48, 50, 52 and 54 also respectively have radially outer ends 49, 51, 53 and 55 that, in the embodiment shown in FIGS. 2 and 3, are at the same radial distance from the axis 62 as the surface 70 of the flex element 30. Also, the spacer links 48, 50, 52 and 54 respectively have radially inner ends 59, 61, 63 and 65 that, in the embodiment of FIGS. 2 and 3, are at the same radial distance as the surface 60 of the flex element 30 from the axis 62.

In the embodiment of the invention illustrated in FIGS. 2, 3 and 4A—4C, the axial thickness 68 of the flex element 30 varies from a small relatively constant thickness intermediate the connection of the flex element with two angularly adjacent spacer links such as spacer links 48 and 52, to a thickness adjacent the connection of the flex element 30 with the spacer links having a minimum value at the radially inward end of the spacer links and increasing to a maximum value at the radially outward end of the spacer links. Where the inner peripheral surface 60 and outer peripheral surface 70 correspond respectively to the inward ends 59, 61, 63 and 65, the outward ends 49, 51, 53 and 55 of the spacer links 48, 50, 52 and 54, the minimum and maximum thickness values will respectively occur at the inner and outer peripheral surfaces. Due to the increasing thickness of the flex elements essentially only along their outer peripheries, the included angle a defining the thickness increases from a zero value intermediate the spacer links to a maximum value adjacent the spacer links and opens in a radially outward direction. In FIGS. 4A, 4B and 4C, a sequence of axial thicknesses 68 of a flex element 30 are illustrated with the minimum thickness at a zero value of angle a shown in FIG. 4A, an intermediate thickness defined by outward opening angle a shown in FIG. 4B and a substantially maximum thickness defined by outward opening angle a shown in FIG. 4C. Increasing the axial thickness 68 of the flex element 30 in a radially outward direction at or adjacent to the spacer links 48 and 50 and 52 and 54 and minimizing the axial thickness 68 between the angularly adjacent spacer links provides reinforcement minimizing the slender column buckling effect in the peripheral direction of the flex element while providing a relatively high degree of flexibility and distribution of flexural stresses adjacent the radially inward end of the spacer links.

In FIGS. 5, 6 and 7A-7C, an alternate embodiment of the invention comprising a flexible coupling 80 is shown. The flexible coupling 80 has two flexible elements 82 and 84 respectively, having opposite sides 86 and 88 and 90 and 92. At least three separate spacer links extend from each of the sides of the elements 82 and 84. The spacer links 94, 96 and 98 extend from the sides 88 and 90 of the flex elements 82 and 84 and connect the flex elements. The links 94, 96 and 98 are preferably spaced apart at an equal distance from each other along the circumference of the element 82 and 84. Spacer links 100, 102 and 104 extend from the side 86 of the flex element 82 and connect the element 82 with a transfer member 120. Also, spacer links 106, 108 and 110 extend from the side 92 of the flex element 84 and connect the element 84 with a transfer member 122. The links 100, 102, 104 and 106, 108, 110 are equally spaced apart from each other along the circumferences of the elements 82 and 84 from which they respectively project. Further, the links 100, 102, 104 and 106, 108, 110 may be spaced intermediate and, preferably, midway between the angularly adjacent spacer links 94, 96 and 98 connecting the flex elements 82 and 84. It may be appreciated that further spacer links projecting from each of the sides of the flex elements may be also added and preferably such further additional links are equally spaced relative to each other and to the spacer links projecting from the opposite side of the flex elements 30 from which they project. In operation, the additional spacer links of the flexible coupling 80 provide two separate benefits. Firstly, the additional spacer links reduce stress levels induced by application of torque to the coupling. This permits increased torque capacity and/or increased failure safety factors beyond that which is possible in a coupling of the same size having fewer spacer links for each flex element. Alternately, it is possible to maintain a given coupling torque capacity within a physically smaller coupling. Secondly, the additional spacer links increase the torsional stiffness of the flex element and this may be a particularly useful feature in a given application, such as in motion control mechanisms wherein minimal torsional deflection of the coupling components is desirable.

The flex elements 82 and 84 shown in FIGS. 5 and 6 and 7A-7C have an axial thickness 112 which increases in a peripheral direction from a position intermediate angularly adjacent spacer links toward the spacer links. Thus the thickness 112 shown in FIG. 7A is small relative to the thickness 112 shown in FIGS. 7B and 7C. This embodiment is most effective in minimizing the slender column buckling effect due to the thickness of the flex elements along the full radial length of the spacer links.

Figure 10A:
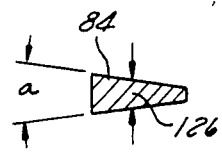
FIGS. 10A, 10B and 10C are cross-sectional views taken along lines 10A—10A, 10B—10B and 10C—10C of FIG. 9.
Figure 10B:
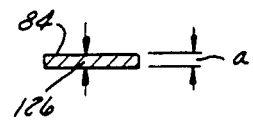
Figure 10C:
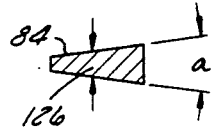
Figure 8:
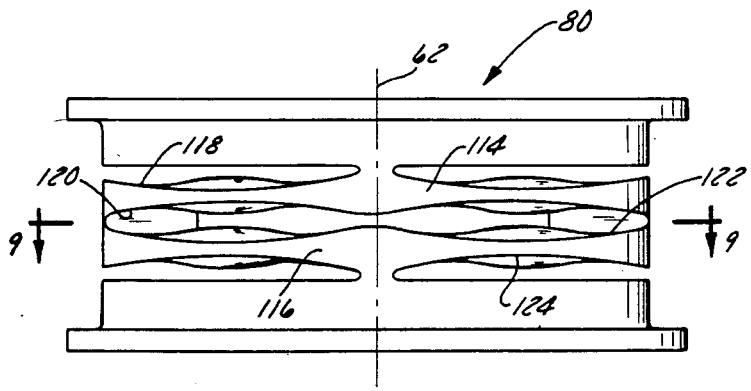
FIG. 8 is a side elevation view of another embodiment of the invention.

In FIGS. 8, 9 and 10A-10C, another embodiment of the flexible coupling is shown in which the flex elements 114 and 116 have an axial thickness 126 which decreases in a radially outward direction at an intermediate position, preferably the midpoint, between two angularly adjacent spacer links from a maximum thickness 126 at the inner periphery 60 to a minimum thickness 126 at the outer periphery 70. This change in thickness creates a radially inward opening angle a as shown in FIG. 10A. At the juncture of a flex element 114 or 116 with each of the spacer links, the axial thickness of the flex element increases from a minimum value at the radially inward end of the spacer link to a maximum value at the radially outward end of the spacer link. This thickness change creates a radially outward opening angle a as shown in FIG. 10C. At a position along the flex element between the spacer links and intermediate or midpoint position between the links, the axial thickness of the flex element is constant in a radial direction as shown in FIG. 10B. Considered in a peripheral or circumferential direction, the axial thickness of the flex element along the radially inward periphery decreases in a direction from the midpoint between adjacent spacer links to the juncture of the flex element with a spacer link. On the other hand, the axial thickness along the radially outward periphery of the flex element increases in a direction from the midpoint between adjacent spacer links to the juncture of the flex element with a spacer link. Whether the change in axial thickness is considered in a radial or peripheral direction, the thickness change is preferably gradual over the entire axial surfaces 118, 120 and 122, 124 of the flex elements.

The embodiment of the invention shown in FIGS. 8, 9 and 10A—10C is particularly suitable for use in coupling operating conditions where it is necessary to distribute stress due to both torque and misalignment. The torque produces particularly high tensile stress concentrations midway between angularly adjacent spacer links and along the inward peripheral surface 60. These stress levels are distributed over a larger area and thereby reduced by the large radially inward axial thickness of the flex members as shown in FIG. 10A. High bending stresses due to coupling flexure as a result of misalignment of the coupled shafts exist in the flex elements adjacent to their connection with the spacer links in the area of the inward peripheral surface 60. The concentration of these flexure stresses is reduced by reducing the axial thickness of the flex elements at the inward peripheral area and distributing the stresses by increasing the thickness in a radially outward direction, as shown in FIG. 10C. At locations along the flex elements intermediate the sections shown in FIGS. 10A and 10C, the flex elements are contoured to provide a varying axial thickness which will cause relatively even distribution of stresses and thus maximize the ability of the coupling to accommodate torsional, misalignment, and dynamic forces.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A flexible coupling connected between a rotary power source and a device driven by the power source and which may be out of alignment with the power source, the flexible coupling including two spaced apart transfer members for transmitting the rotary power comprising:

at least one flex element positioned between and spaced from the transfer members, the flex element having an axis extending toward the transfer members, an axial thickness in the direction of the axis, and opposite sides facing in the axial direction;

a first plurality of spaced apart spacer links connected directly to one of the sides of the flex element and also connected to one of the transfer members, and a second plurality of spacer links connected directly to the other of the sides of the flex element and also connected to the other of the transfer members, the flex element being stressed due to transfer to it by the spacer links of rotary power force from a transfer member and force due to misalignment of the rotary power source and the drive device; and the flex element has a plurality of spaced apart areas of potential high stress, the axial thickness of the flex element increasing in a radially outward direction adjacent each spacer link so as to cause distribution of stress at said areas within the flex element.

2. The flexible coupling in accord with claim 1 wherein the axial thickness of the flex element decreases in a radially outward direction intermediate each spacer link.

3. The flexible coupling in accord with claim 1 wherein the flex element has a peripheral area and the spacer links are connected to the flex element along the peripheral area, the axial thickness of the flex element increasing in a peripheral direction and toward a spacer link along a portion of the peripheral area.

4. The flexible coupling in accord with claim 1 wherein the flex element has a peripheral area, said peripheral area including a gradual contour connecting a portion of the peripheral area adjacent to a spacer link and a portion of the peripheral area intermediate said spacer link and an adjacent spacer link.

5. The flexible coupling in accord with claims 1, 2, 3 or 4 further comprising:
a plurality of said flex elements juxtaposed between and spaced from the transfer members; and
a plurality of spaced apart spacer links between and connected to the confronting sides of each adjacent ones of the plurality of flex elements.

6. The flexible coupling in accord with claims 1, 2, 3, or 4 wherein the first plurality of spacer links includes at least three spacer links connected to one side of the flex element and the second plurality of spacer links includes at least three spacer links connected to the other side of the flex element, at least the spacer links connected to said one of the sides of the flex element also being connected to one of the transfer members.

7. A flexible coupling including spaced apart hub members for transmitting rotary power comprising:
at least one flex element positioned between and spaced from the hub members, the flex element having a periphery, an axis extending toward the hub members, an axial thickness in the direction of the axis, and opposite sides facing in the axial direction;
a first plurality of spacer links connected directly to one of the sides of the flex element and also connected to one of the hub members and a second plurality of spacer links connected directly to the other of the sides of the flex element and also connected to another of the hub members whereby the spacer links apply rotary power and misalignment force from the connected hub members to stress the flex element; and
the flex element has an axial thickness defined by an included angle in a radial plane parallel to and passing through the axis, the included angle varying along the periphery of the flex element in size and in the radial direction in which it opens, the size of the included angle and the direction of its opening being such that said stress is distributed within the flex element.

8. The flexible coupling in accord with claim 7 wherein the included angle is relatively large and opens in a radially inward direction intermediate two adjacent spacer links along the periphery of the flex element whereby the flex element has a relatively large axial thickness at a position radially inward of the periphery to cause distribution of stress due to tension occurring at such position.

9. The flexible coupling in accord with claim 7 or 8 wherein the included angle is relatively large and opens in a radially outward direction at the juncture of the spacer link and the flex element whereby the flex element has a relatively thin axial thickness radially inward of the periphery at said juncture causing reduction of bending stress at that location.

10. The flexible coupling in accord with claim 9 wherein the included angle has a zero value at each transition location between a radially outward opening and a radially inward opening included angle.

11. A flexible coupling connected between a rotary power source and a device driven by the power source and which may be out of alignment with the power source, the flexible coupling including two spaced apart transfer members for transmitting the rotary power comprising:
at least one flex element positioned between and spaced from the transfer members, the flex element having an axis extending toward the transfer members, an axial thickness in the direction of the axis, and opposite sides facing in the axial direction;
a first plurality of spaced apart spacer links connected directly to one of the sides of the flex element and also connected to one of the transfer members, and a second plurality of spacer links connected directly to the other of the sides of the flex element and also connected to the other of the transfer members, the flex element being stressed due to transfer to it by the spacer links of rotary power force from a transfer member and force due to misalignment of the rotary power source and the driven device;
the flex element varying in axial thickness peripherally about its axis to substantially equalize the stress concentrations in the flex element resulting from the stresses transferred to it by the spacer links; and
the flex element is symmetrical with respect to a plane bisecting said axial thickness and is symmetrical in peripheral directions on opposite sides of each spacer link.

12. The flexible coupling in accord with claim 11 wherein the axial thickness of the flex element increases in a radially outward direction adjacent each spacer link.

13. The flexible coupling in accord with claim 11 wherein the axial thickness of the flex element decreases in a radially outward direction intermediate each spacer link.

14. The flexible coupling in accord with claim 11 wherein the flex element has a peripheral area and the spacer links are connected to the flex element along the peripheral area, the axial thickness of the flex element increasing in a peripheral direction and toward a spacer link along a portion of the peripheral area.

15. The flexible coupling in accord with claims 11, 12, 13, or 14 further comprising:
a plurality of said flex elements juxtaposed between and spaced from the transfer members; and
a plurality of spaced apart spacer links between and connected to the confronting sides of each adjacent ones of the plurality of flex elements.

16. The flexible coupling in accord with claim 15 wherein the axial thickness has a contour which varies in a peripheral direction along the entire peripheral length of the flexible element between angularly adjacent flexible elements.

* * * * *